(12) United States Patent  
Hellberg et al.

(10) Patent No.: US 8,317,319 B2  
(45) Date of Patent: Nov. 27, 2012

(54) CO-AXIAL MULTI-TIP EYEGLASS RETAINER COUPLING AND METHOD OF USE

(76) Inventors: Karl Hellberg, Logan, UT (US); Cody Archibald, Logan, UT (US)

( * ) Notice: Subject to any disclaimer, the term of this patent is extended or adjusted under 35 U.S.C. 154(b) by 182 days.

(21) Appl. No.: 12/889,842

(22) Filed: Sep. 24, 2010

(65) Prior Publication Data

US 2012/0075573 A1 Mar. 29, 2012

(51) Int. Cl.
*G02C 3/00* (2006.01)
(52) U.S. Cl. ........................................... 351/157
(58) Field of Classification Search .................... 351/41, 351/156–158
See application file for complete search history.

(56) References Cited

U.S. PATENT DOCUMENTS 6,644,808 B1 * 11/2003 Liu ............................... 351/156
D631,085 S * 1/2011 Hellberg ...................... D16/339

\* cited by examiner

*Primary Examiner* — Huy K Mai
(74) *Attorney, Agent, or Firm* — J Todd Rushton (57) ABSTRACT

An eyeglass retainer coupling having a plurality of co-axially aligned connection apertures, each aperture having a different inside diameter designed to accommodate the wide variety of modern eyeglass and sunglass frame styles and sizes. A large frame eyeglass temple can be inserted into the outmost connection aperture for sufficient retention. Whereas, a medium or small frame temple may be inserted through one or more of the larger connection apertures and into a connection aperture having a proper fit. The user may also choose to cut away or remove oversize connection apertures if the eyeglass retainer is used for eyeglasses having small temple earpieces.

16 Claims, 6 Drawing Sheets

CO-AXIAL MULTI-TIP EYEGLASS RETAINER COUPLING AND METHOD OF USE

BACKGROUND OF THE INVENTION

The present invention relates generally to a co-axial multi-tip eyeglass retainer coupling and method of use. More specifically, this disclosure relates to an eyeglass retainer coupling having a series of co-axially aligned connection apertures that will accommodate a wide variety of eyeglass temple earpiece sizes.

Eyeglasses are often coupled with a retainer system, to provide ease of access when removed, to prevent loss or damage, and to secure the eyeglasses during vigorous activity such as outdoor recreation, physical fitness, or sports. Various connection techniques are used to couple the retainer systems to the frame portion of the eyeglasses; including, loops, clasps and sleeves.

One of the shortcomings with conventional sleeve connector and retainer systems is their limited accommodation for engaging a wide variety of components. For example, sleeve eyeglass retainer connectors are generally limited to accommodating a small variety of frame sizes, despite the large variety in frame shapes and thicknesses among modern eyeglasses. Manufacturers and retailers are therefore, forced to produce and sell a wide variety of similar items, with slightly different coupling sizes. This is undesirable from both of the manufacturing and retail perspectives, forcing manufacturers to build expensive tools and change out molds for a production run of each of the different coupling sizes and requiring the retailer to use valuable counter space to display similar eyeglass retainers having different coupling sizes. Additionally, both the manufacturer and the retailer are required to predict the whimsical changes in eyeglass fashion and set the quantity of each size eyeglass retainer to match the final sales of the eyeglasses and sunglasses for the season.

This lack of accommodation prevents users from making impulsive purchases by requiring them to specifically analyze whether their eyeglasses fit a particular retainer system. This problem is enhanced when the purchase of fit-specific merchandise is intended as a gift where the buyer may not know the type or size of eyeglass frames used by the recipient.

Therefore, there is a need in the industry for an eyeglass retainer connector that overcomes the limitations and inefficiencies of the previously available devices.

SUMMARY OF THE INVENTION

A first embodiment of the present invention is an elastomeric co-axial multi-tip eyeglass retainer coupling that includes a plurality of connection apertures, the outermost connection aperture being the largest, with each subsequent aperture decreasing in size. There is no set limit on the number of connection apertures used, in one embodiment there may be two connection apertures, wherein for a second embodiment there may be three connection apertures, in another embodiment, there may be four connection apertures, and in yet other embodiments, there may be greater than four connection apertures. Each connection aperture in the system is substantially aligned on the same central axis extending through the eyeglass retainer coupling and into the retainer cordage.

In one embodiment of the present invention, each of the outer connection apertures is an annular ring having a depth or length proportionally related to the diameter of the ring. The depth or length of the ring decreases with the diameter. The outermost ring being the largest diameter and most shallow or shortest, the subsequent rings have smaller diameters and are deeper or longer. This allows for substantially equal contact area and strength as related to engagement with the respective eyeglass temples. In yet other embodiments, the connection apertures or annular rings may have substantially the same depth regardless of the connection aperture diameter.

In one embodiment of the present invention, the connection apertures are connected using two stirrups or thin straps of elastomeric material on opposite sides of the connection apertures. The stirrups connect to the bottom edge and blend over the outside wall of the outermost connection aperture and connect to the top edge and blend over the outside wall of a second subsequent connection aperture. Stirrups originating from the bottom edge the second aperture connect to the top edge of a subsequent third aperture. This pattern is repeated to connect all connection apertures in the system. While connection using two stirrups is describe, it in understood that any multiple of stirrups may be used to connect the connection apertures.

In another embodiment of the present invention, the annular rings or connection apertures are connected directly by engaging the bottom inside edge of the larger connection aperture with the top outside edge of the subsequent smaller connection aperture. This arrangement has the profile of an inverted wedding cake or a step drill bit.

In one embodiment, the annular rings or connection apertures have interior walls parallel with the central axis and are joined to the smaller subsequent connection apertures with a shoulder that is substantially 90 degrees from the central axis. Whereas, the exterior wall of the coupling or connection apertures is a uniform taper from the leading edge of the outermost connection aperture to some point on the smallest or final connection aperture.

In yet another embodiment of the present invention, due to the pliable nature of the elastomeric material it is contemplated to form the eyeglass coupling using a uniformly tapered sleeve having an outermost portion with a large diameter and the end portion having a substantially smaller diameter. However, it is recognized that this embodiment presents limitations including, reduced overall surface contact area with the eyeglass temple, undefined connection aperture transitions, and areas of undesirably loose fit with the eyeglass temple.

In one embodiment, the innermost connection aperture is formed as an annular ring connected to the retainer portion using stirrups or elastomeric straps.

In another embodiment, the innermost connection aperture is formed as a uniform portion of a connection sleeve that attaches to the cordage portion of the eyeglass retainer.

In one embodiment, the multi-tip eyeglass retainer coupling is formed as a unitized portion of an elastomeric eyeglass retainer system.

In one embodiment, the multi-tip eyeglass retainer coupling is formed, using elastomeric material, as an independent component having a retainer cordage attachment sleeve. The retainer cordage can be cut to length, coated with an adhesive, and inserted into the attachment sleeve forming a completed eyeglass retainer.

In one embodiment, the multi-tip eyeglass retainer coupling, is formed using elastomeric material, as an independent component having an eyeglass retainer coupling end and an attachment end forming a loop. The retainer cordage may be formed of elastomeric material having an attachment portion formed as a loop, on each end, or the retainer cordage may be a commercially available nylon, leather, cotton or other suitable cordage, with elastomeric attachment portions which are bonded or overmolded onto the eyeglass retainer cordage. The eyeglass retainer couplings can be attached to the retainer cordage by connecting the attachment portions of each component using an interconnecting member that is formed as one of a clip or an s-hook.

In yet another embodiment of the present invention, the elastomeric co-axial multi-tip eyeglass retainer coupling can be formed by direct bonding or overmolding to commercially available cordage, such as nylon, leather, cotton, stainless steel cable or other suitable cordage. The injection mold is formed having a radial rib pattern, the space between the ribs allows elastomeric material to flow through the pattern and into a retention collar. An inverse of the radial pattern is formed on the overmolded portion of the eyeglass retainer cordage. It is found that the pressure during overmolding allows a portion of the elastomeric material to penetrate into most cordage for a bond which is superior to adhesives. Additionally, overmolding the multi-tip eyeglass retainer couplings to the eyeglass retainer cordage leads to direct labor savings during product assembly.

Each embodiment of the present invention may be universally used for retention of eyeglasses or sunglasses regardless of the frame and temple earpiece size. The co-axial multi-tip eyeglass retainer coupling is designed having multiple annular rings or connection apertures that slide over the end of the eyeglass temple in a sport retention configuration. A heavy framed eyeglass, similar to many of the modern full tapered temple sunglasses, having a thick terminating end or earpiece may require attachment using the outermost or largest connection aperture. For attachment, the eyeglass temple is moistened and then inserted through the outermost aperture, once dry, friction from the expanded connection aperture will securely retain the eyeglass temple. Large frame eyeglass temples should not be inserted into the smaller connection apertures where excess expansion of the elastomeric material may cause failure of the aperture or excess pressure may break the eyeglass temple.

An eyeglass or sunglass having a medium frame or medium thickness temple can be inserted through the outmost or largest connection aperture and into the smaller subsequent connection aperture. In this arrangement, the outmost connection aperture is retained and will fit loosely over the eyeglass temple. The subsequent smaller connection aperture is securely expanded over the temple and provides secure retention of the eyeglasses. By retaining the outermost connection aperture, the eyeglass retainer can be removed and installed on large frame eyeglasses or sunglasses at the user's convenience. However, some users find that the outermost connection aperture presents excess bulk or is visually distracting when installed on medium frames. In such a situation, the user may simply cut the stirrups, attaching the outermost connection aperture to the subsequent connection aperture, flush with the top edge of the subsequent connection aperture, prior to installation of the retainer coupling on the eyeglass temple or the user may cut the stirrups and the outermost connection aperture while the retainer couple is in place on the eyeglass temple.

Eyeglasses or sunglasses having a light or wire frame, such as the popular "aviator" sunglass, can be retained by inserting the temple into the innermost or smallest connection aperture. Again, the temple earpiece can be inserted through the preceding larger connection apertures and into the smallest connection aperture while retaining the larger apertures for the event that the user chooses to transfer the eyeglass retainer to a larger framed pair of eyeglasses or the user may again trim the multi-tip eyeglass retainer coupling stirrups flush with the top edge of the smallest connection aperture.

In one embodiment, the eyeglass retainer coupling is configured having connection apertures connected directly or without stirrups, the user may choose to trim the multi-tip eyeglass retainer coupling to provide an optimal fit with smaller eyeglass temples by cutting through the junction point between the connection apertures.

In yet another embodiment, where the outer wall of the connection apertures in a continuous taper, index marks may be provided to insure proper trimming at the junction point between the connection apertures.

These and other features and advantages of the disclosure will be set forth and will become more fully apparent in the detailed description that follows and in the appended claims. The features and advantages may be realized and obtained by the instruments and combinations particularly pointed out in the appended claims. Furthermore, the features and advantages of the disclosure may be learned by the practice of the methods or will be obvious from the description, as set forth hereinafter.

BRIEF DESCRIPTION OF DRAWINGS

The following description of the embodiments can be understood in light of the Figures, which illustrate specific aspects of the embodiments and are part of the specification. Together with the following description, the Figures demonstrate and explain the principles of the embodiments. In the Figures the physical dimensions of the embodiment may be exaggerated for clarity. The same reference numerals in different drawings represent the same element, and thus their descriptions may be omitted.

DETAILED DESCRIPTION OF THE INVENTION

For the purposes of promoting an understanding of the principles in accordance with the disclosure, reference will be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

As used in this specification and the appended claims, the singular forms "a," "an," and "the" include plural referents unless the context clearly dictates otherwise. In describing and claiming the present disclosure, the following terminology will be used in accordance with definitions set out below. As used herein, the terms "comprising," "including," "containing," "characterized by," and the grammatical equivalents thereof are inclusive or open-ended terms that do not exclude additional, unrecited elements or method processes.

The disclosure relates to a co-axial multi-tip eyeglass retainer coupling and method of use. In particular, the disclosure relates to a co-axial eyeglass retainer coupling that may be attached directly to, or modified and then attached to, the end portion of eyeglass temples of varying size including, oversize or heavy frame eyeglass temples, medium eyeglass temples or wire frame or thin eyeglass temples.

An eyeglass earpiece is the portion of the eyeglass temple that directly engages the ear of the user for purposes of support and retention. Various cross-section thicknesses and shapes may be included in eyeglass frame earpieces.

An eyeglass retainer may be a device that may be releasably coupled to the frame of a pair of eyeglasses or sunglasses. An eyeglass retainer may be used to secure the eyeglasses during vigorous activities such as sports and to prevent inadvertent removal. Likewise, an eyeglass retainer may be used as a storage system, such that eyeglasses can be removed and hung from the user's neck while not in use.

An eyeglass retainer coupling is the portion of the retainer that mechanically engages the end portion of the eyeglass temple earpiece.

Figure 1:
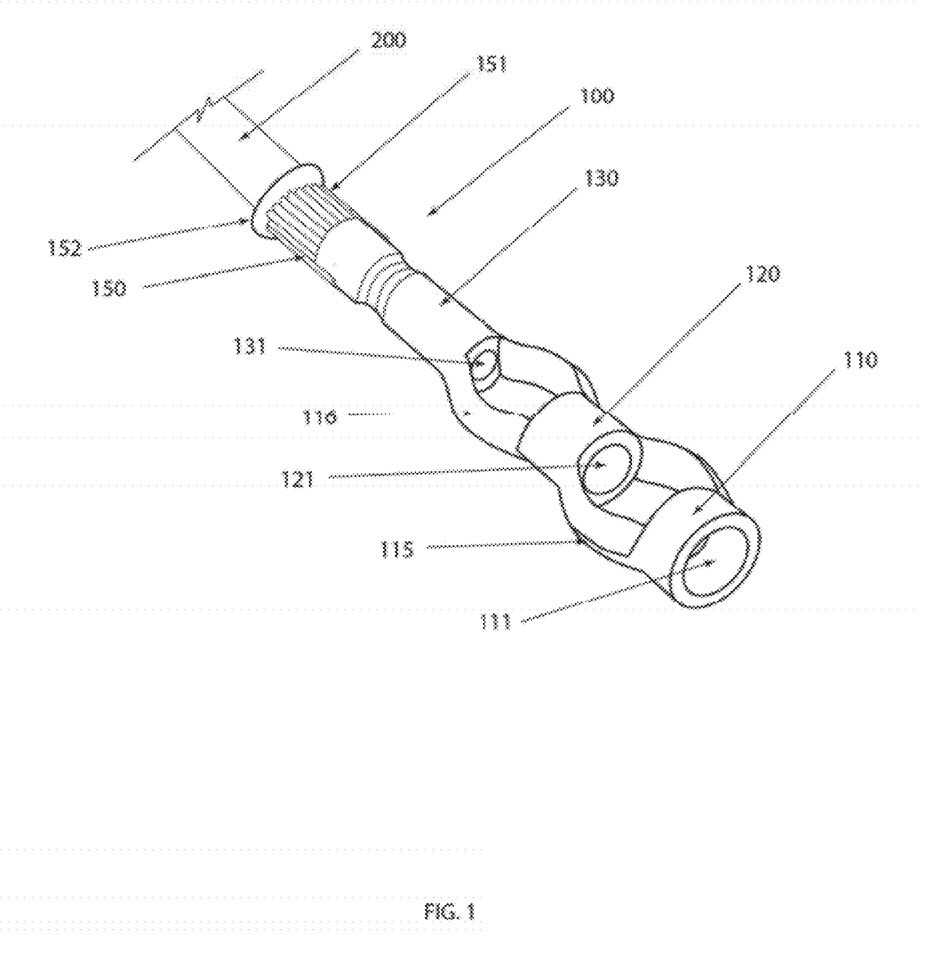
FIG. 1 illustrates an isometric view of a co-axial multi-tip eyeglass retainer coupling in accordance with one embodiment of the disclosure.

Illustrated in FIG. 1, is an isometric view of a co-axial multi-tip eyeglass retainer coupling 100. The retainer coupling 100 having a plurality of the annular rings or connection apertures, including outermost connection aperture 110, subsequent connection aperture 120 and connection aperture or sleeve 130 that are substantially aligned along a central axis that extends from the outermost connection aperture 110 to the retainer cordage 200. It is appreciated and understood that the number of connection apertures may vary according to changes in eyeglass or sunglass fashion and frame style. Connection aperture 110 includes, a large aperture opening 111 designed to accommodate large or thick frame eyeglass temples, connection aperture 120 includes, aperture opening 121 which will accommodate medium thickness eyeglass temple earpieces, connection aperture or sleeve 130 includes, a smaller aperture opening 131 which will accommodate small or wire frame eyeglass temple earpieces. The bottom edge of connection aperture 110 is connected to the top edge of the subsequent connection aperture 120 by stirrups or connection straps 115. The bottom edge of connection aperture 120 is connected to the top edge of sleeve 130 by stirrups or connections straps 116. The retainer coupling 100 is attached to eyeglass retainer cordage 200 with attachment portion 150. Attachment portion 150 may be configured as a sleeve which is adhesively attached to retainer cordage 200 or the attachment portion 150 may be formed on retainer cordage 200 using an overmolding process. When overmolding is used, an end portion of eyeglass retainer cordage 200 is inserted directly into an injection molding cavity and is axially aligned. When viscous elastomeric material is injected into the mold, the material will flow through the rib pattern voids creating a distinctive inverse rib pattern 151 and into support collar 152 on eyeglass retainer coupling 100.

Figure 2:
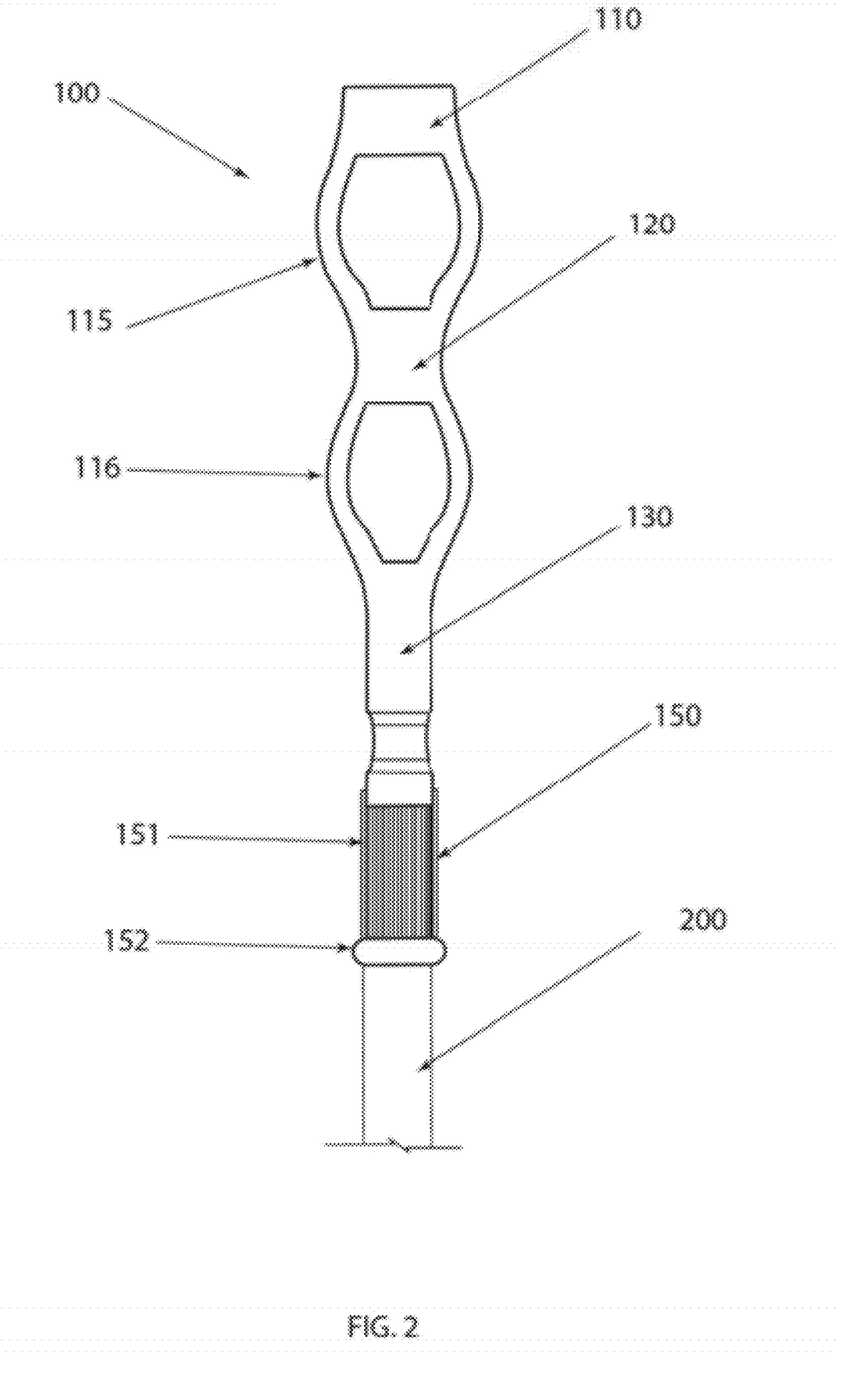
FIG. 2 illustrates a top view of a co-axial multi-tip eyeglass retainer coupling in accordance with one embodiment of the disclosure.
Figure 3:
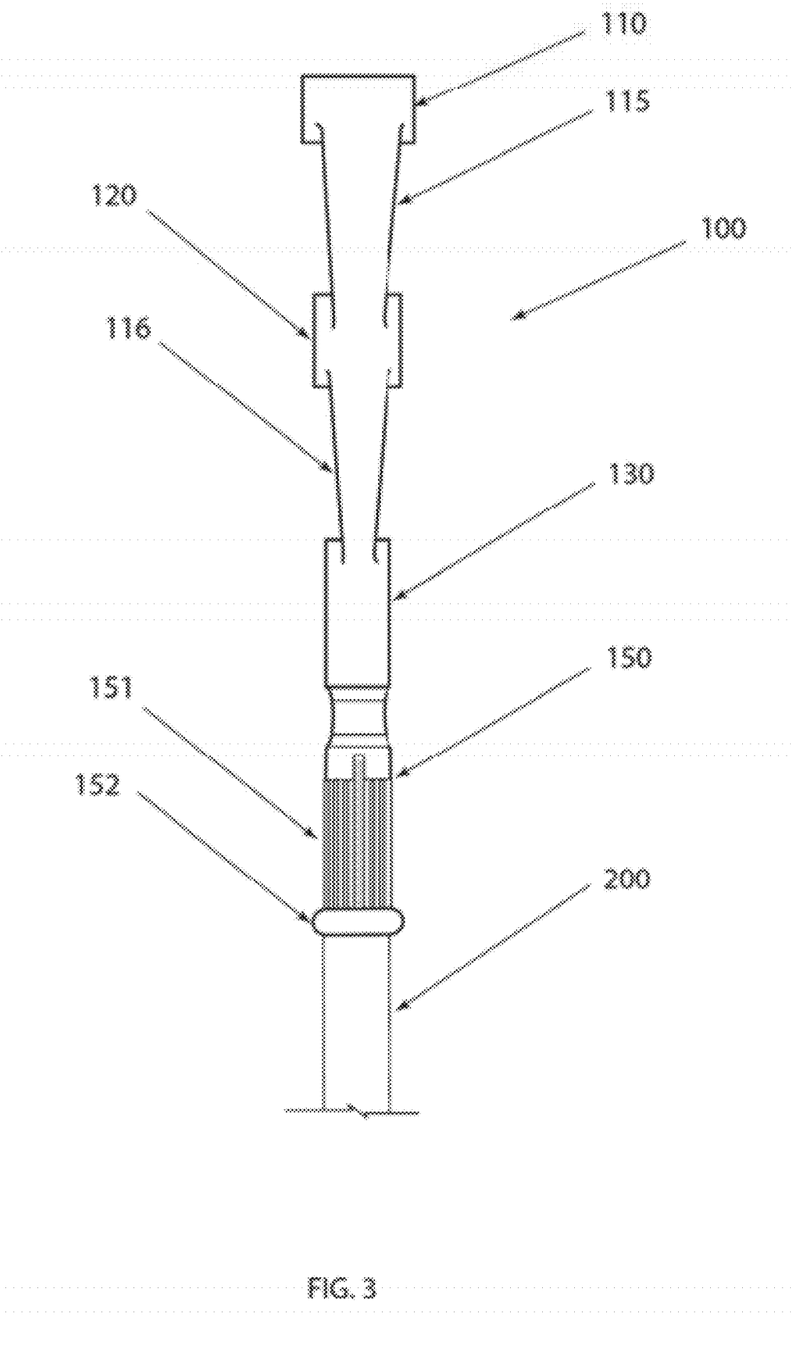
FIG. 3 illustrates a side view of a co-axial multi-tip eyeglass retainer coupling in accordance with one embodiment of the disclosure.

FIGS. 2 and 3 are respectively a top and side view of co-axial multi-tip eyeglass retainer coupling 100 with features therein, which are previous enumerated in the detailed description of FIG. 1.

Figure 4A:
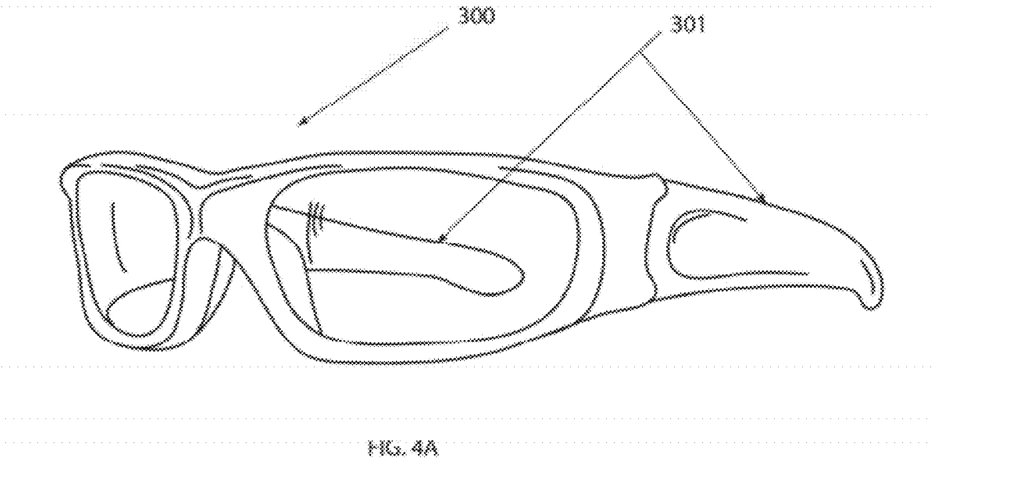
FIG. 4A illustrates a typical eyeglass frame style having a thick or heavy frame and temple earpieces.

Illustrated in FIG. 4A is typical large or heavy frame eyeglass 300 having large temples 301.

Figure 4B:
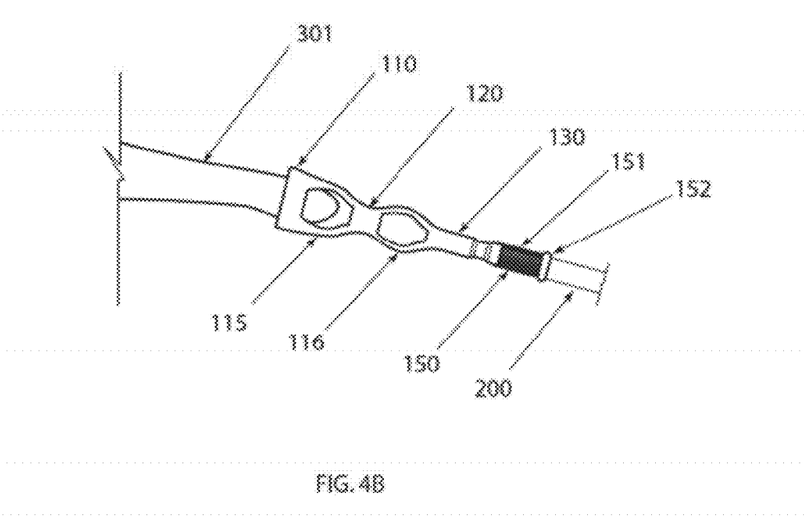
FIG. 4B illustrates one embodiment of a co-axial multi-tip eyeglass retainer coupling installed on a heavy eyeglass temple earpiece.

FIG. 4B shows co-axial multi-tip eyeglass retainer coupling 100 installed on the temple 301 of heavy frame eyeglasses 300. After moistening the temple 301, connection aperture 110 is pushed over the end portion of temple 301. Expansion of the elastomeric material used in eyeglass retainer coupling 100 allows for a secure friction connection between connection aperture 110 and eyeglass temple 301.

Figure 5A:
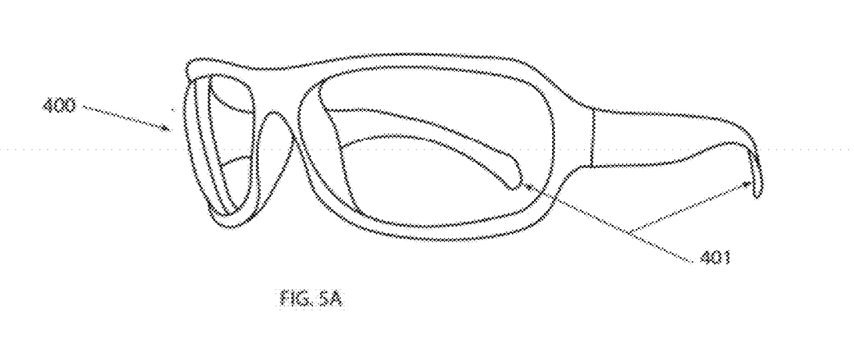
FIG. 5A illustrates a typical eyeglass frame style having a medium frame and temple earpieces.

Illustrated in FIG. 5A is typical medium eyeglass 400 having medium temples 401.

Figure 5B:
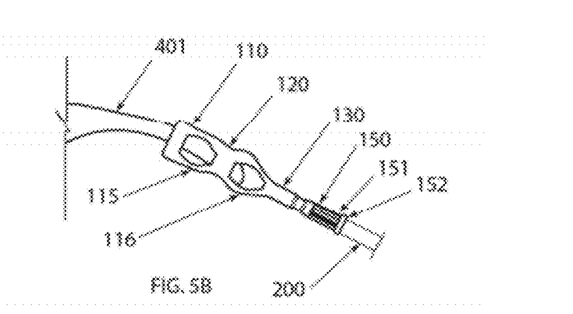
FIG. 5B illustrates one embodiment of a co-axial multi-tip eyeglass retainer coupling installed on a medium eyeglass temple earpiece.

FIG. 5B shows co-axial multi-tip eyeglass retainer coupling 100 installed on the temple 401 of medium frame eyeglasses 400. After moistening the temple 401, connection apertures 110 and 120 are pushed over the end portion of temple 401. Expansion of the elastomeric material used in eyeglass retainer coupling 100 allows for a secure friction connection between connection aperture 120 and eyeglass temple 401. By retaining connection aperture 110, eyeglass retainer coupling 100 can be removed and installed on another pair of glasses of any size as desired by the user.

Figure 5C:
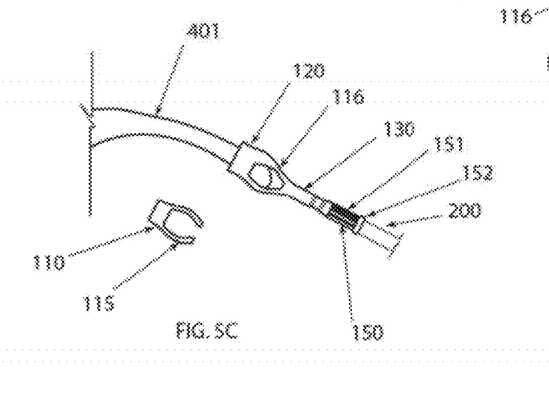
FIG. 5C illustrates one embodiment of a co-axial multi-tip eyeglass retainer coupling with a single connection aperture removed and the retainer installed on a medium eyeglass temple earpiece.

FIG. 5C shows co-axial multi-tip eyeglass retainer coupling 100, with connection aperture 110 removed, and installed on the temple 401 of medium frame eyeglass 400. In order to present a more compact fit of eyeglass retainer coupling 100 on a medium frame temple 401 the user may remove the large outermost connection aperture 110 by cutting stirrups 115 flush with the top edge of subsequent connection aperture 120.

Figure 6A:
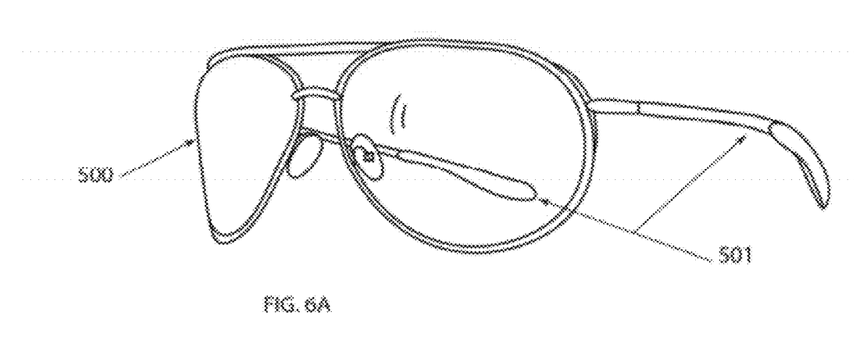
FIG. 6A illustrates a typical eyeglass frame style having a thin wire frame and temple earpieces.

Illustrated in FIG. 6A is typical wire or thin framed eyeglass 500 having wire or thin temples 501.

Figure 6B:
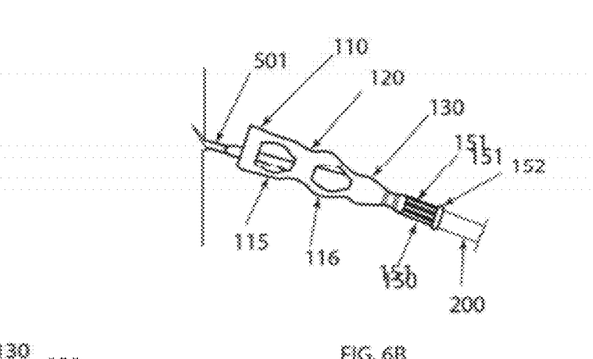
FIG. 6B illustrates one embodiment of a co-axial multi-tip eyeglass retainer coupling installed on a thin wire eyeglass temple earpiece.

FIG. 6B shows co-axial multi-tip eyeglass retainer coupling 100 installed on the temple 501 of wire or thin frame eyeglasses 400. After moistening the temple 501, connection apertures 110, 120, and 130 are pushed over the end portion of temple 401. Expansion of the elastomeric material used in eyeglass retainer coupling 100 allows for a secure friction connection between connection aperture or sleeve 130 and eyeglass temple 501. By retaining connection apertures 110 and 120, eyeglass retainer coupling 100 can be removed and installed on another pair of glasses of any size as desired by the user.

Figure 6C:
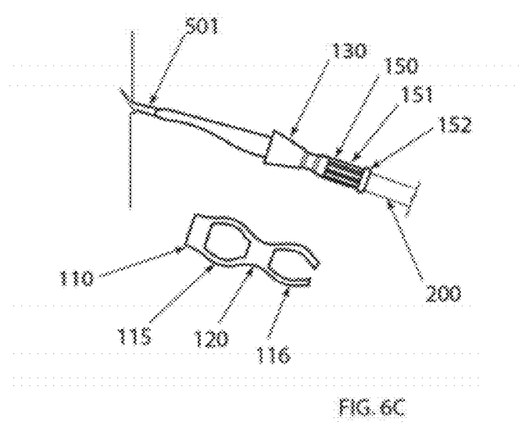
FIG. 6C illustrates one embodiment of a co-axial multi-tip eyeglass retainer coupling with two connection apertures removed and the retainer installed on a thin wire eyeglass temple earpiece.

FIG. 6C shows co-axial multi-tip eyeglass retainer coupling 100, with connection apertures 110 and 120 removed, and installed on the temple 501 of thin or wire frame eyeglass 500. In order to present a more compact fit of eyeglass retainer coupling 100 on a thin or wire frame temple 501 the user may remove the larger connection apertures 110 and 120 by cutting stirrups 116 flush with the top edge of connection sleeve or connection aperture 130.

In view of the foregoing, those having ordinary skill in the relevant art will appreciate the advantages provided by the features of the present disclosure.

It is to be understood that the above mentioned arrangements are only illustrative of the application of the principles of the present disclosure. Numerous modifications or alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. An eyeglass retainer coupling comprising;
a plurality of connection apertures which are co-axially aligned,
each of the plurality of connection apertures having an outside surface, an inside surface, a top edge and a bottom edge,
the bottom edge of one of the plurality of connection apertures is connected to the top edge of the subsequent connection aperture by severable stirrups, and,
each of the plurality of connection apertures having a different inside diameter.

2. The eyeglass retainer coupling of claim 1, wherein the plurality of connection apertures include two connection apertures.

3. The eyeglass retainer coupling of claim 1, wherein the plurality of connection apertures include three connection apertures.

4. The eyeglass retainer coupling of claim 1, wherein the plurality of connection apertures include four or more connection apertures.

5. The eyeglass retainer coupling of claim 1, wherein the outermost connection aperture having the largest inside diameter and,
each subsequent connection aperture having a smaller inside diameter than the previous connection aperture.

6. The eyeglass retainer coupling of claim 1, wherein the outermost connection aperture having the smallest inside diameter and,
each of the subsequent connection apertures having a larger inside diameter than the previous connection aperture.

7. The eyeglass retainer coupling of claim 1, wherein the eyeglass retainer coupling is composed of an elastomeric material.

8. The eyeglass retainer coupling of claim 1, including a connection sleeve.

9. The eyeglass retainer coupling of claim 1, wherein the eyeglass retainer coupling is adhesively attached to a retainer cord.

10. The eyeglass retainer coupling of claim 1, wherein the eyeglass retainer coupling is overmolded on a retainer cord.

11. A method of using an eyeglass retainer coupling comprising:
providing an eyeglass retainer coupling having a plurality of connection apertures which are co-axially aligned, each connection aperture having a different inside diameter, at least one of the plurality of connection apertures attached to the subsequent connection aperture by severable stirrups;
providing a pair of eyeglasses having a temple earpiece and;
inserting the temple earpiece through one or more of the connection apertures until the temple earpiece is frictionally restrained by one of the plurality of connection apertures.

12. The method of claim 11, wherein the temple earpiece is large and,
inserting the temple earpiece into the outmost connection aperture.

13. The method of claim 11, wherein the temple earpiece is medium,
inserting the temple earpiece through the outermost connection aperture and into a subsequent connection aperture.

14. The method of claim 11, wherein the outermost connection aperture is removed.

15. The method of claim 11, wherein the temple earpiece is thin,
inserting the temple earpiece through the outermost connection aperture and the subsequent connection aperture and,
inserting the temple earpiece into a connection sleeve.

16. The method of claim 11, wherein the outermost connection aperture and the subsequent connection aperture are removed.

* * * * *